United States Patent [19]

Goker et al.

[11] Patent Number: 4,739,950
[45] Date of Patent: Apr. 26, 1988

[54] CONSTANT VELOCITY TAPE DRIVE SYSTEM

[75] Inventors: Turgay Goker, Spring Valley; Henry L. Alioth, Carlsbad; Charles J. Spatafore, Poway, all of Calif.

[73] Assignee: TEAC Corporation of America, Montebello, Calif.

[21] Appl. No.: 901,757

[22] Filed: Aug. 28, 1986

[51] Int. Cl.$^4$ .................. B65H 77/00; H02P 5/46
[52] U.S. Cl. .................. 242/203; 242/75.52; 360/73
[58] Field of Search ............. 242/201, 203, 206, 207; 360/73; 242/191, 186, 75.45, 75.51, 75.52; 318/7, 318

[56] References Cited

U.S. PATENT DOCUMENTS

| | | | |
|---|---|---|---|
| 3,625,457 | 12/1971 | Weidenhammer | 242/207 X |
| 3,704,401 | 11/1972 | Miller | 242/75.51 X |
| 3,849,661 | 11/1974 | Beiter | 242/75.52 X |
| 4,125,881 | 11/1978 | Eige | 242/186 X |
| 4,172,231 | 10/1979 | d'Alayer | 242/191 X |
| 4,497,459 | 2/1985 | Yoshino | 242/186 |
| 4,531,166 | 7/1985 | Anderson | 360/73 |

Primary Examiner—John Petrakes
Assistant Examiner—Katherine Matecki
Attorney, Agent, or Firm—Spensley Horn Jubas & Lubitz

[57] ABSTRACT

This system moves magnetic tape past the read/write head at a constant velocity by separately servo controlling the source reel motor and the take-up reel motor. Separate fine encoders are associated with each reel, each encoder providing multiple pulses for each revolution of the respective reel. Two radius calculation circuits each receive pulses from a respective one of the encoders and each calculate therefrom the radius values of tape on both of the reels. A radius information selector then selects, for use in controlling the motors, that set of radius values which is calculated by the calculation circuit which is receiving encoder pulses at the greater sampling rate. Separate servo circuits drive the two motors at respective angular velocities determined by utilizing the selected set of radius values. In each drive circuit, the associated tape radius is multiplied by the actual reel angular velocity, as indicated by the time duration between consecutive pulses from the encoder associated with that reel. Each servo maintains this product equal to a preselected tape linear velocity value, thereby causing the separate motors to rotate the reels so as to establish the desired constant linear tape velocity.

10 Claims, 5 Drawing Sheets

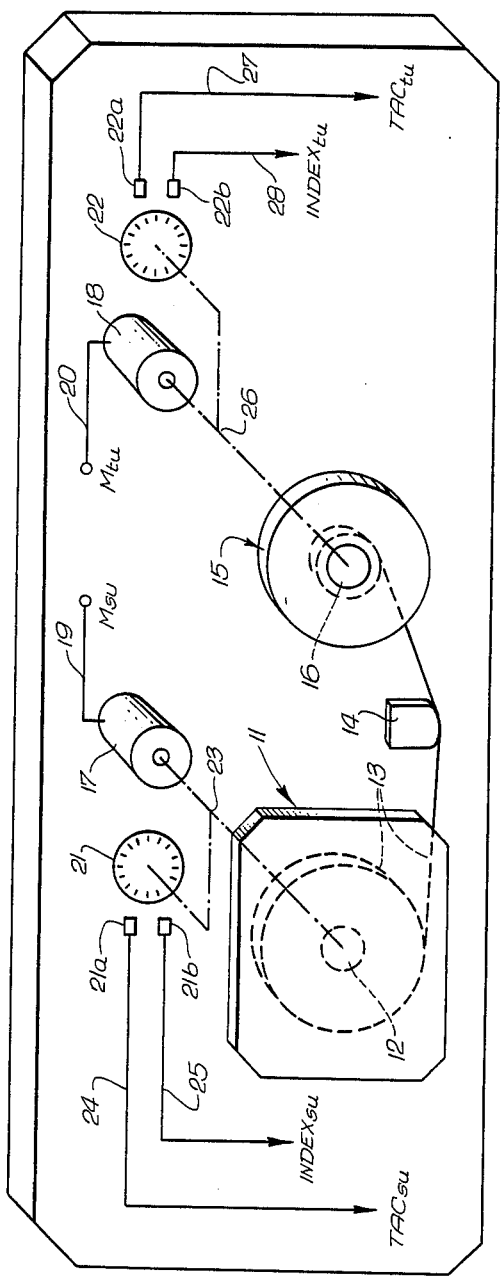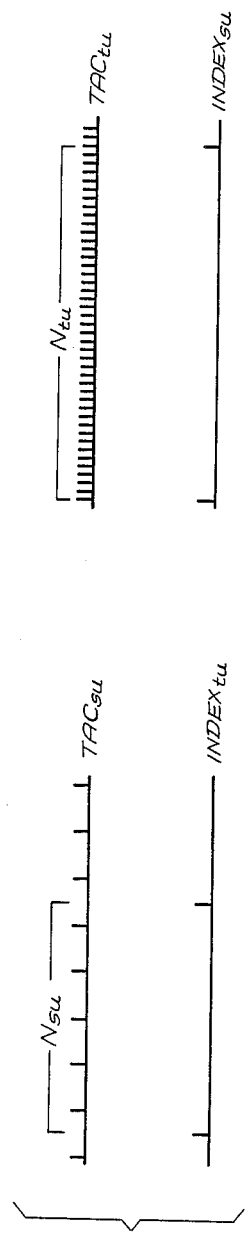
Fig. 1
Fig. 2

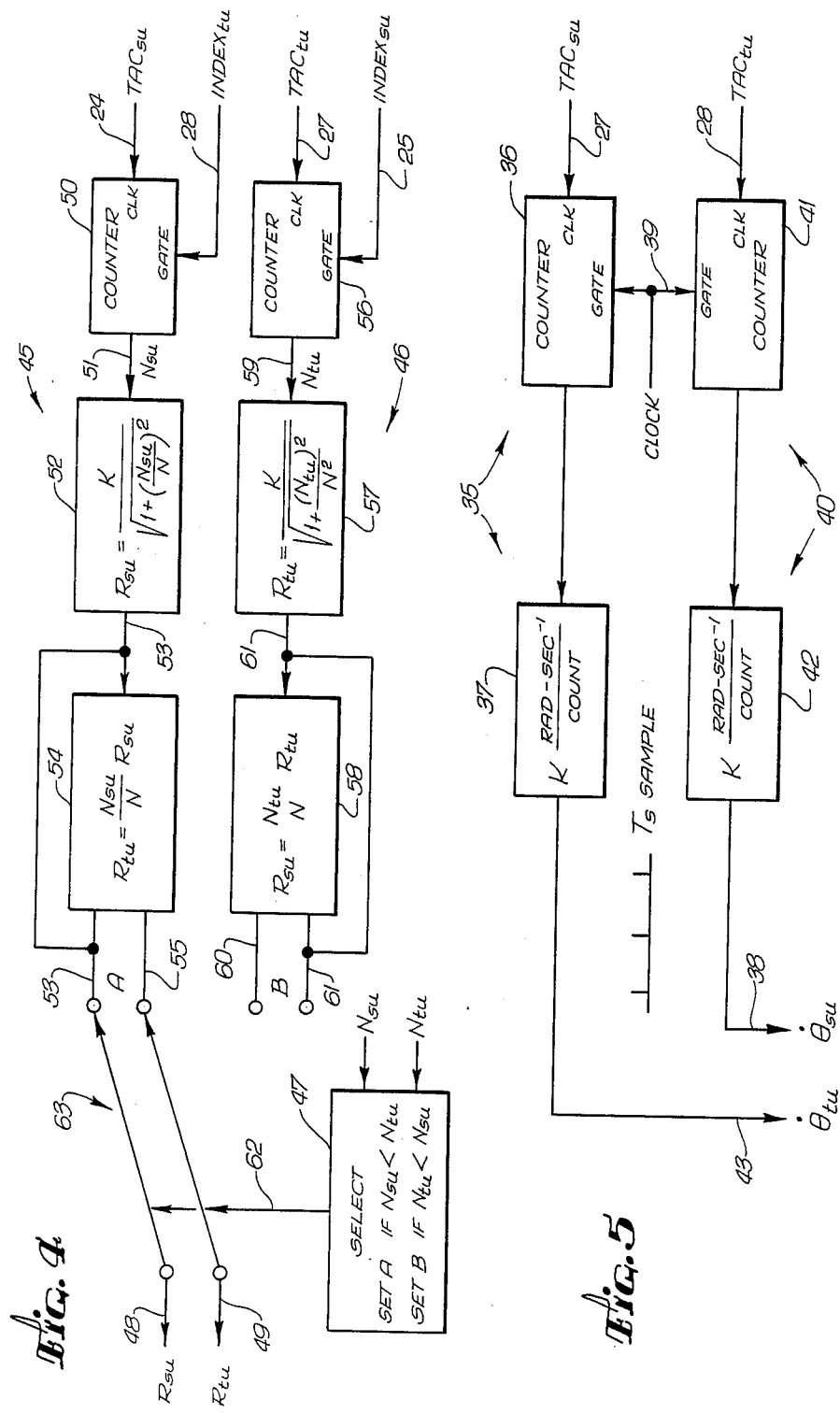

CONSTANT VELOCITY TAPE DRIVE SYSTEM

BACKGROUND OF THE INVENTION

1. Field of the Invention

The present invention relates to a system for moving magnetic tape past a read/write head at a constant velocity by separately servo controlling the source reel motor and the take-up reel motor.

2. Description of the Prior Art

Present day personal computers often include hard disk drives capable of storing very large quantities of data, typically 20, 40, or 80 megabytes. If the hard disk drive should "crash" or malfunction, this data may be irretrievably lost. Reconstruction of the data from its original input at best is tedious, and at worst may be impossible if the original input records are no longer available.

Accordingly, it is desirable periodically to archive the contents of the hard disk drive. Magnetic tape is a particularly desirable media for such archival storage. Recently certain magnetic tape cartridges have been introduced which are well suited for this purpose. The cartridge itself contains a single tape-containing reel. It is utilized in a drive system in which the leader end of the tape first is pulled from the cassette and attached to a take-up reel that is external to the cassette. An appropriate drive system controls reel rotation so as to achieve the desired tape velocity past a read/write head. The present invention, although not so limited, is well suited for controlling the reel drive motors in such a cassette tape system.

In view of the very large amounts of data which typically must be transferred from a hard disk to a cassette tape for archival purposes, it is desirable to maximize the read/write data transfer rate to the magnetic tape. To accomplish this with maximum accuracy requires that the tape be transported past the head at a tightly controlled, constant velocity. An objective of the present invention is to provide such a constant velocity tape drive system.

Direct measurement of the tape velocity past the head is impractical. For example, such direct velocity measurement could be achieved by having the tape pass in contact with an idler wheel, the rotational rate of which would directly indicate tape velocity. However, this would require the use of mechanical elements, such as the idler itself, with which the tape must be held in good contact to assure accurate velocity measurement. Such mechanical arrangement has the deleterious effect of introducing unwarranted drag tension forces on the tape, thereby potentially complicating rather than simplifying the overall control problem.

Source or take-up reel rotational velocity can be measured with reasonable accuracy. However, to calculate the linear tape velocity past the head from the measured reel angular velocity requires knowledge of the current tape radius on the reel. This radius changes continuously as tape is transferred between the source and take-up reels. Thus reel radius information also must be obtained continuously if the reel angular velocity is to be used to measure and control tape speed past the head. Another object of the present invention is to provide a system in which such reel angular velocity and tape radius are continuously and accurately measured and utilized in a constant velocity tape drive system.

One approach to such angular velocity tape radius measurement is presented in the U.S. Pat. No. 4,125,881 to Eige et al. In that system the source reel is provided with an encoder which emits N pulses during each revolution of the source reel. The number of such pulses emitted during a single revolution of the other, take-up reel is counted. From this count value, the present tape radius can be calculated using a certain "radius constant". That constant is related to the radius of the reel hub and the maximum radius of the tape when all of the tape is wound on only one reel.

In the system of the U.S. Pat. No. 4,125,881 such radius constant and single encoder count value are used to obtain current tape radius values for both the source and take-up reels. The time between occurrence of the single encoder "fine tach pulses" is compared with a known time period that should occur if the tape is moving at the correct velocity. Any difference represents a velocity error. This error value is used as a common input to the servo drivers for both the source and take-up reel motors.

A system in which a single fine encoder is used, situated on one or the other of the source and take-up reels, has certain inherent shortcomings. When most of the tape is on the reel having the encoder, only a very few pulses are emitted during one revolution of the other reel. As a result, radius calculation accuracy is substantially reduced as compared with the accuracy which is achieved when most of the tape has been transferred to the other reel. Under that latter condition, many pulses will be emitted from the encoder during one revolution of the other reel, with concomitant higher radius calculation accuracy.

Thus in such a prior art system, radius measurement accuracy varies greately depending on how much tape has already been transferred from one reel to another. As a result, the accuracy with which linear tape velocity control can be achieved will vary depending on how much tape has been transferred.

This problem is compounded when the angular velocity measurement is taken into account. Since the time between encoder pulses is used as a measurement of reel angular velocity, this measurement likewise will be affected by the amount of tape presently on the reel. With small amounts of tape on the reel, consecutive encoder pulses will occur very rapidly, thereby reducing the accuracy with which the period can be measured.

It is a further object of the present invention to eliminate these shortcomings of the prior art by providing a constant velocity tape drive system in which separate fine encoders are provided on both the source and take-up reels, and in which information is utilized from one or the other of these, depending on which is presently providing the more accurate information.

Another factor to be taken into account in a tape drive system of the type described is the tension on the portion of the tape extending between the reels. Advantageously this tension should be held constant. If the tension varies, undesirable fluctation of the tape may occur. This may cause concomitant tape speed fluctations past the head, or could even cause irregularities in tape contact with the head.

In the above mentioned U.S. Pat. No. 4,125,881 a separate mechanical tension transducer is used to sense mechanically the tape tension between the two reels. A tension sensing arm provides a tension error signal that is supplied to the drivers of both motors.

Another object of the present invention is to provide a constant velocity tape drive system which includes an open loop tape tension control without using a mechnical tension sensor.

SUMMARY OF THE INVENTION

These and another objectives are achieved by providing a constant velocity tape drive system in which the source reel and take-up reel respectively are driven by separate motors. Each motor itself is controlled by an independent servo system that is responsive to the separately measured angular velocity of the associated reel.

A separate fine encoder is provided on each of the source and take-up reels. The time between occurrence of consecutive pulses from each encoder is used as a separate velocity measurement for each reel.

For tape radius measurement, the number of pulses emitted by the fine encoder of the source reel is counted for one revolution of the take-up reel, and also the number of pulses emitted by the fine encoder of the take-up reel is counted for one revolution of the source reel. The present source and take-up reel radii are separately calculated from each of these values. However only one set of these radius values is supplied to the motor drive servos. Specifically, a selection is made of that set which is currently most accurate.

This selection is done in accordance with which of the two fine encoders produces the greater number of pulses for one revolution of the other reel. The radius information selector provides to the drive servos those radius values that are calculated using the output of the encoder which provides the greater number of pulses per revolution of the other reel. This arrangement aids the accuracy of the current tape radii calculations, and thus enhances the performance of the constant velocity tape drive system.

BRIEF DESCRIPTION OF THE DRAWINGS

A detailed description of the invention will be made with reference to the accompanying drawings wherein like numerals designate corresponding elements in several figures.

FIG. 1 is a pictorial view of a cassette drive assembly incorporating the inventive constant velocity tape drive system.

FIG. 2 is a graphic illustration of the output pulses from the separate fine encoders associated with the source and take-up reels of the drive assembly of FIG. 1.

FIG. 4 is a block diagram of the radius calculator and radius information selector circuits utilized in the tape drive system of FIG. 3.

FIG. 5 is a block diagram of the source and take-up reel velocity measurement circuits utilized in the tape drive system of FIG. 3.

DESCRIPTION OF THE PREFERRED EMBODIMENT

Figure 3:
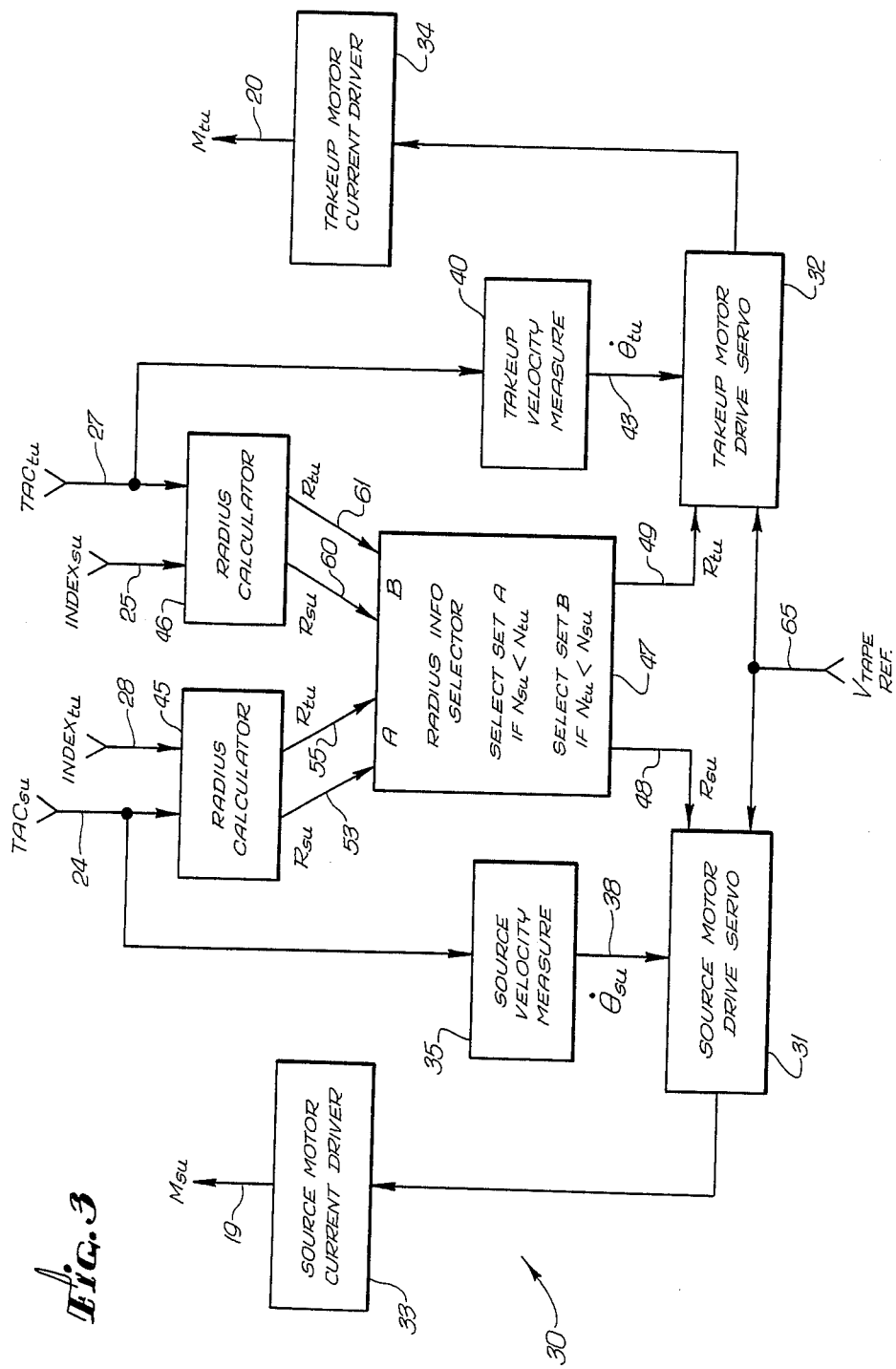
FIG. 3 is a block diagram of the inventive constant velocity tape drive system employed in the assembly of FIG. 1.

The following detailed description is of the best presently contemplated mode of carrying out the invention. This description is not to be taken in a limiting sense, but is made merely for the purpose of illustrating the general principles of the invention.

Shown in FIG. 1 is a tape drive assembly 10 utilizing a removable tape cassette 11. The mechanism for accommodating the insertion and removal of the cassette 11 from the drive assembly 10 may be conventional, and forms no part of the present invention. The cassette 11 itself is of the type having a single hub 12 about which a tape 13 is wound. Within the drive assembly 10, the cassette 11 serves as the "source reel" and is referred in this manner herein.

Tape from the cassette 11 is guided past a read/write head 14 to a take-up reel 15 within the drive assembly 10. The manner in which the leader of the tape 13 is withdrawn from the cassette 11 and directed to the hub 16 of the take-up reel 15 may be conventional, and forms no part of the present invention.

The objective of the present invention is to drive the tape 13 past the head 14 at a constant velocity. To accomplish this, the cassette or source reel 11 and the take-up reel 15 are separately driven by respective motors 17 and 18. These are supplied with respective drive signals $M_{su}$ and $M_{tu}$ via the lines 19 and 20 from the tape drive system of FIG. 3.

Associated with each of source and take-up reels is a separate fine encoder or tachometer 21 and 22. The encoder 21 is driven from the source reel shaft 23 and includes a sensor 21a which detects fine graduations that are equally angularly spaced around the encoder. For example, this may be a conventional optical encoder so that the sensor 21a is a photodetector. There may be a very large number of graduations on the encoder 21, so as to produce, for example, 4,320 output pulses for each revolution of the source reel 11. These output pulses herein are designated $TAC_{su}$, and supplied via a line 24 to the circuitry of FIG. 3. Advantageously the encoder 21 also provides an index pulse $INDEX_{su}$ at least once per revolution of the supply reel 11. This is detected by a sensor 21b and provided to the circuit of FIG. 3 via a line 25.

The encoder 22, which is driven from the shaft 26 of the take-up reel 15, may be identical to the encoder 21. Accordingly it has a sensor 22a that supplies fine encoder pulses $TAC_{tu}$ via a line 27 to the circuitry of FIG. 3. Similarly it includes a sensor 22b that provides an index pulse designated $INDEX_{tu}$ via a line 28 to the circuitry of FIG. 3. This index pulse is of course provided at least once per revolution of the take-up reel 15, whereas the encoder 22 provides a very large number N fine encoder pulses $TAC_{tu}$ during the same one revolution of the take-up reel 15.

As indicated in FIG. 3, the tape drive system 30 utilizes information from both encoders 21, 22 to provide separate tape radius and reel angular velocity information respectively to two drive servo circuits 31, 32 that separately drive the source and take-up reel motors 17, 18 via respective current drivers 33, 34.

Each servo 31, 32 drives its associated motor 17, 18 at a respective rate that should produce the same desired linear velocity $V_{tape\ ref}$ of the tape 13 past the head 14. The outputs from the encoders 21, 22 then are used to provide feedback information to the servos 31, 32 of actual reel angular velocity and present tape radius. The tape linear velocity as it leaves or approaches a particular reel is equal to the angular velocity of that reel (for example, in radians per second) times the current tape radius of that reel. Thus, since each of the drive servos 31, 32 is provided separately with reel angular velocity and tape radius, each servo can compensate for any difference between the desired tape linear velocity and the actual velocity as determined using the encoder outputs. In this manner, the two drive servos 31, 32 can separately control the motors 17, 18 so that each drives its respective source and take-up reel 11, 15 so as to impart to the tape 13 the same linear tape velocity as it leaves and reaches these respective reels. In this manner, constant tape velocity past the head 14 is achieved.

The angular velocity of the source reel 11 is measured by a circuit 35 (FIGS. 3 and 5). The number of pulses $TAC_{su}$ delivered from the source reel fine encoder 21 in a fixed interval of time is directly proportional to the angular velocity of the source reel 11. Thus in the circuit of FIG. 5, the number of pulses from the encoder 21 during a certain sample time interval $T_s$ is counted in a counter 36, as is well known in the art. The encoder pulses $TAC_{su}$ are directed to the clock input of the counter 36. Sample clock signals, occuring at the $T_s$ rate, gate out the contents of the counter 36 and reset that counter to zero for the next counting cycle. The number which is gated out, representing the number of encoder 21 pulses per sample time $T_s$, is proportional to the actual angular velocity of the reel 11. This number is multiplied by the corresponding constant in a circuit 37 to provide on a line 38 a signal representing the angular velocity $\theta_{su}$ of the source reel 11. Advantageously, but not necessarily, the circuits 36 and 37 are digital, so that the angular velocity representation on the line 38 is itself a digital value which is updated at each $T_s$ time interval, i.e., upon each occurrence of the sample clock pulse on a line 39. The disclosure of this paragraph is well known to those skilled in the art.

Similarly, the actual angular velocity of the take-up reel 15 is measured in a circuit 40 utilizing a counter 41 and multiplier 42. These utilize the output signals $TAC_{tu}$ from the encoder 22 to provide on a line 43 the angular velocity $\theta_{tu}$ of the take-up reel 15. The disclosure of this paragraph is well known to those skilled in the art, except that the prior art does not disclose the use of separate tachometers $TAC_{su}$ and $TAC_{tu}$ for the independent calculation of the two reel angular velocity values $\theta_{tu}$ and $\theta_{su}$.

Determination of the present tape radius on each of the reels 11, 15 is done concurrently in a pair of radius calculator circuits 45, 46. The most accurate of the resultant two sets of calculated radius values is selected by a circuit 47. The resultant values of the radius $R_{su}$ of the tape on the source reel 11 is supplied to the drive servo 31 via a line 48 and the current radius $R_{tu}$ of the tape on the take-up reel 15 is supplied to the drive servo 32 via a line 49.

The initial or maximum radius of the tape 13 in the cassette 11 generally is not known, and needs to be measured as an initial operation of the system 30. It is accomplished in the following manner, which is disclosed in the aforementioned Eige U.S. Pat. No. 4,125,881.

When the cassette 11 is first loaded into the assembly 10, the leader of the tape 13 is connected to the take-up reel hub 16. This hub is of known radius $R_{Htu}$. The motor 18 then is driven so as to rotate the take-up reel 15 through one revolution, as indicated by two consecutive occurrences of the $INDEX_{tu}$ signal on a line 28.

During this single revolution of the take-up reel 15 the source reel encoder 21 will produce an initial number $N_{sui}$ pulses $TAC_{su}$ on the line 24. This number $N_{sui}$ will be smaller than the total number N of pulses produced by the encoder 21 for a full revolution of the source reel 11, since during this initial wrap of the tape onto the take-up reel 15 the source reel 11 will rotate through only a portion of one revolution. The initial source reel tape radius $R_{msu}$ is related to the radius $R_{Htu}$ of the take-up hub 16 by:

$$R_{msu} = \frac{N}{N_{sui}} R_{Htu}$$

By geometric considerations, there is derived a radius constant K given by:

$$K = \sqrt{R_{msu}^2 + R_{Htu}^2}$$

which is used to relate the tape radius on the source reel 11 to the number of pulses occuring from the source reel fine encoder 21 during a single revolution of the take-up reel 15.

For use both during the initial radius constant calculation and during the on-going tape radius measurements, the radius calculator 45 includes a counter 50 (FIG. 4) which counts the number of fine encoder pulses $TAC_{su}$ from the source reel encoder 21 which occur during one revolution of the take-up reel 15. To this end, the pulses $TAC_{su}$ are supplied to the clock input of the counter 50. The index pulse $INDEX_{tu}$ from the take-up reel encoder 22 is used to gate out the count of the counter 50 onto a line 51 and concurrently to reset to zero the counter 50 contents. Accordingly, the number $N_{su}$ which occurs on the line 51 corresponds to the number of fine encoder output pulses from the source reel encoder 21 which occur during one revolution of the take-up reel 15, that is, between two consecutive occurences of the signal $INDEX_{tu}$. An example of this is illustrated at the left of FIG. 2, when the example shown number $N_{su}=5$.

Since the radius constant K is known, the present radius of the tape 13 on the source reel 11 can be calculated directly from this number $N_{su}$, and this is done in the calculation circuit 52 using the equation shown therein. Advantageously, but not necessarily, this calculation is performed digitally using the digital value of the number $N_{su}$ supplied from the counter 50. As a result, there is produced as an output on the line 53 a value $R_{su}$ representing the current radius of the tape 13 on the source reel 11.

From this source reel radius $R_{su}$ and the ratio $N_{su}/N$ the current radius of the tape on the take-up reel 15 can be calculated, and this is done in the circuit 54 using the equation shown therein. As a result there is provided on the line 55 the value $R_{tu}$ representing the current radius of the tape on the take-up reel 15. As noted earlier, such technique is disclosed in the Eige U.S. Pat. No. 4,125,881.

Notice that both the source and take-up tape radius values supplied on the lines 53 and 55 are derived from the single fine pulse output of the source reel encoder 21. As a result, the accuracy of these reel radius values will vary considerably depending on how much tape is present on the source reel 11. Notice that when most of the tape is on the source reel 11, only a few $TAC_{su}$ pulses will occur for each complete revolution of the take-up reel 15. That is, the value $N_{su}$ will be numerically small, and will change only slightly, or perhaps not at all, for a few revolutions of the source reel 11. On the other hand, when there is relatively little tape remaining on the source reel 11 there will be a relatively large number of $TAC_{su}$ pulses produced from the encoder 21 for a single revolution of the take-up reel 15. The numerical value $N_{su}$ will be relatively large, and will change more for a few revolutions of the source reel 11 as compared with the change in the number $N_{su}$ when a large amount of the tape remains on the cassette 11. Accordingly, the accuracy of the radius calculations performed by the circuit 45 will differ depending on whether much or little tape remains on the source reel 11, and will be more accurate when there is less tape on that cassette.

In accordance with the present invention, to minimize the error introduced by this variation in radius calculation, there is provided a second radius calculator 46 which utilizes the output $TAC_{tu}$ of the take-up reel encoder 22 to separately calculate both the source and take-up reel tape radii. This is done using a counter 56 and calculation circuits 57, 58 corresponding respectively to the counter 50 and circuits 52, 54 of the radius calculator 45. These circuits produce a count value $N_{tu}$ on a line 59 and produce calculated source and take-up reel tape radius values respectively on the lines 60 and 61.

From the forgoing it will be appreciated that the more accurate set of tape radius values $R_{su}$ and $R_{tu}$ will be obtained from that one of the calculator circuits 45, 46 which is receiving the greater number of fine encoder pulses per revolution of the other reel. Accordingly, the radius information selector circuit 47 compares the values $N_{su}$ and $N_{tu}$ and produces a selection signal on a line 62 in accordance with which of these is larger. If the source reel encoder 21 produces more $TAC_{su}$ pulses for one revolution of the take-up reel, as compared with the number of pulses $TAC_{tu}$ produced by the encoder 22 for one revolution of the source reel, then the set A radius values obtained from the circuit 45 is provided via a switch 63 (operated by the signal on the line 62) to lines 48 and 49. This condition generally occurs when less than half of the tape remains on the source cassette 11. On the other hand, when most of the tape is still on the source cassette 11, the take-up reel encoder 22 will be producing the larger number of pulses per revolution of the other reel. Under that condition, the information selector 47 will cause the set B of radius values from the calculator 46 to be supplied via the lines 48 and 49 to the motor drive servos 31 and 32. In that manner, optimal sampling rate and optimal radius calculation accuracy is achieved.

Figure 6:
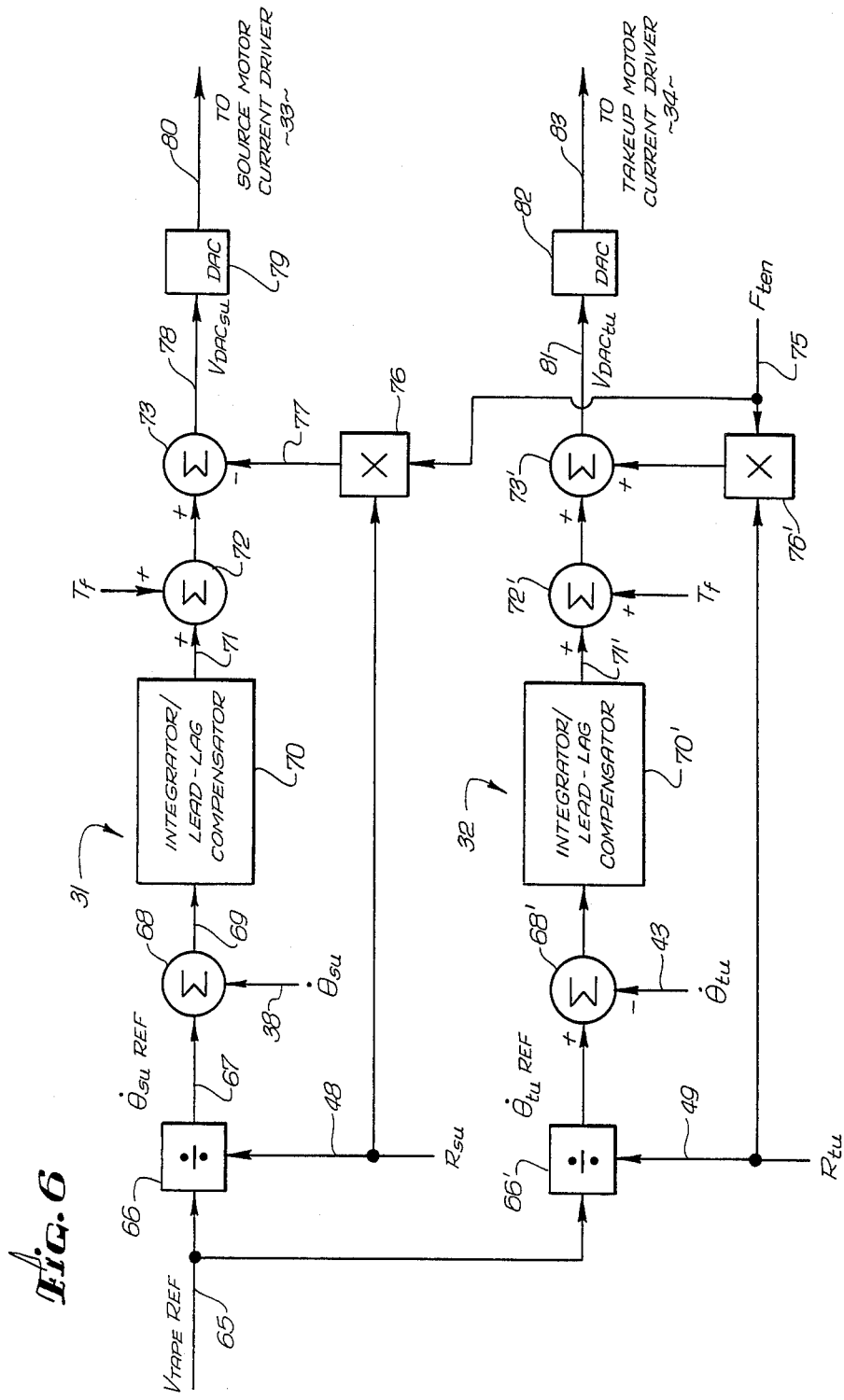
FIG. 6 is a block diagram of the motor drive servos utilized in the tape drive system of FIG. 3.

In accordance with the present invention, substantially constant linear tape velocity past the head 14 is achieved by individually controlling the source and take-up reel drive motors 17, 18 so as to separately produce the same linear tape velocity $V_{tape\ ref}$ of the tape leaving or reaching the corresponding source and take-up reel 15. To accomplish this, the separate motor drive servos 31 and 32 (FIG. 3 and 6) are provided with a signal on a line 65 representing this desired linear tape velocity. Advantageously, but not necessarily, the drive servos 31 and 32 are implemented digitally, and reference tape velocity value is provided in digital format on the line 65.

Since each motor 17, 18 imparts angular velocity to the corresponding reel, the desired linear tape velocity value first is converted to a desired angular velocity value, taking into account the present tape radius on the corresponding reel. Thus in the source motor drive servo 31, a circuit 66 divides the desired linear tape velocity value by the current radius $R_{su}$ of tape on the source reel 11. As discussed above, this will be the optimum value of $R_{su}$ as selected by the circuit 47. As a result there is produced on the line 67 a value representing the desired angular velocity $\dot{\theta}_{su\ ref}$ represents the angular velocity at which the motor 17 should rotate the source reel 11 to achieve the desired linear tape velocity of the tape 13 leaving (or entering) the cassette 11.

This desired velocity is compared with the actual source reel velocity $\dot{\theta}_{su}$ as measured by the circuit 35 described above. This is done at a summing junction 68 to produce on a line 69 an error signal indicative of any difference between the actual rotation of the motor 17 and its desired angular velocity.

The signal on the line 69 is processed by an integrator/lead-lag compensator circuit 70 to provide on a line 71 a control signal indicative of the amount of drive required to make the motor 17 rotate the source reel 11 at the appropriate angular velocity.

This signal on the line 71 then is modified by two additional factors. The first of these is the static friction or drag force which must be overcome by the motor 17. Accordingly, a constant value $T_f$, indicative of the amount of torque which the motor 17 must produce to overcome the static friction of the system, is added to the control signal on the line 71 at a summing junction 72.

The second factor which modifies the motor drive signal relates to the desired tension $F_{ten}$ that is to be exerted on the portion of the tape 13 between the source and take-up reels. To obtain the appropriate tension, opposing torques are applied to the two reels, each of which is proportional to the tape radius on that reel. The result is to place the tape 13 under a certain preselected tension, while still achieving the desired constant tape velocity past the head 14.

To this end, a desired tape tension value $F_{ten}$ is supplied via a line 75 to a circuit 76 in which it is multiplied by the present source tape radius $R_{su}$. Since the desired tension $F_{ten}$ is given in force units such as ounces, the output of the multiplier 76 will be a tension torque value, for example in ounce-inch units. This tension torque value is supplied via line 77 as a negative input to a summing junction 73 so as to have the effect of reducing slightly the magnititude of the drive signal to the source reel motor 17 (assuming that the tape is being supplied from the cassette 11). The resultant motor drive signal is supplied via a line 78 and a digital-to-analog converter 79 and a line 80 to the current driver 33 (which may be of the switch mode type) for the source reel motor 17.

The drive servo 32 associated with the take-up reel motor 18 is configured like the drive servo 31. Thus it employs a divider 66', a summing junction 68', an integrator/lead-lag compensator 70', a summing junction 72' and a multiplier 76' corresponding in function and operation to the like numbered but unprimed elements of the drive servo 31. However, in this take-up motor drive servo 32 the tension torque value supplied from the multiplier 76' is added into the summing junction 73' so as to effectively slightly increase the drive signal supplied to the take-up motor 18 (assuming that the tape is being fed from the cassette 11). As noted above, it is this slight increase in the drive signal to the motor 18 combined with the slightly decreased drive signal to the motor 17 that results in the appropriate tensioning of the tape 13.

The resultant drive signal to the take-up reel motor 18 is supplied via a line 81, a digital-to-analog converter 82 and a line 83 to the take-up motor current driver circuit 34, which may be of the switch mode type. The current driver circuits 33 and 34 shown in FIG. 7 are known per se.

Figure 7:
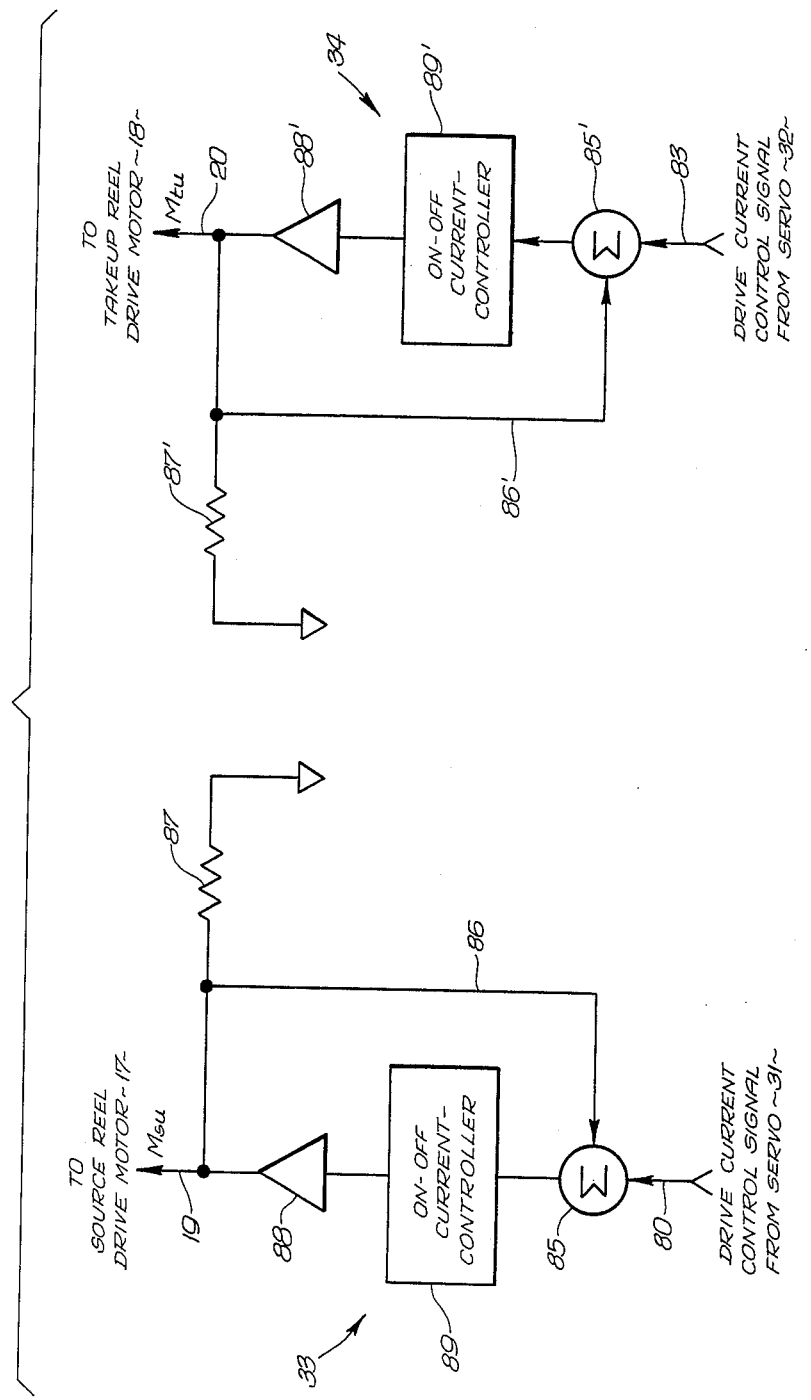
FIG. 7 is a block diagram of the motor current drivers utilized in the tape drive system of FIG. 3.

As evident from FIG. 7, the source reel motor current driver 33 receives the drive current control signal from the servo 31 via the line 80. This is combined at a summing junction 85 with an analog feedback signal, supplied via a line 86, that is indicative of the amount of current actually being supplied to the source reel drive motor 17. This feedback signal is derived across a resistor 87 connected to the output of a motor driver amplifier 88. The signal from the summing junction 85 is supplied via an on-off current controller circuit 89 to the amplifier 88.

With this arrangement, the conventional current driver circuit 33 advantageously exhibits a fast current loop response time that is significantly faster than the bandwidth of the velocity drive servos 31 and 32. Accordingly, the drive signal actually provided to the motor 17 by the amplifier 88 will very accurately follow the value of the drive current control signal supplied via the line 80 from the servo 31.

The current driver 34 associated with the take-up reel drive motor 18 has a same configuration as the driver circuit 33. Thus it includes a summing junction 85', a feedback path 86', a resistor 87', a driver amplifier 88 and an on-off current controller circuit 88' all corresponding to the unprimed but like numbered elements of the drive circuit 33.

By use of the inventive tape drive system, constant velocity of the tape 13 past the head 14 is achieved.

We claim:

1. In a magnetic tape drive of the type in which separate motors are used to rotate a source reel and a takeup reel respectively, the improvement comprising:
   first and second fine encoders each associated with a respective reel, each encoder providing multiple pulses at a pulse rate dependent on a reel rotation speed,
   first and second tape radius calculation circuits, each receiving pulses from a respective one of said encoders and each calculating therefrom the radius values of tape on both of said reels,
   radius information selector means for selecting, for use in controlling said motors, that set of radius values which is calculated by that calculation circuit which is receiving encoder pulses at a greater pulse rate, and
   servo drive means for separately driving said motors at respective angular velocities determined by utilizing said selected set of radius values.

2. The improvement of claim 1 wherein each encoder includes means for providing at least one index signal per single revolution of the associated reel, the number of index signals per single revolution being less than the number of pulses provided by the encoders per single revolution of the associated reel and wherein said selector means includes means for ascertaining which encoder has the greater pulse rate by determining which encoder currently is providing the greater number of pulses between two consecutive index signals from the other encoder.

3. The improvement of claim 1 wherein said servo drive means includes first and second drive servos each driving a respective one of said motors, each of said drive servos receiving a reel actual angular velocity feedback signal obtained by measuring the time duration between consecutive pulses provided by the respective fine encoder of the reel associated with that drive servo.

4. The improvement of claim 3 wherein said servo drive means includes means for driving the respective motors so as to achieve a substantially constant linear tape velocity of the tape moving between said reels, wherein said servo drive means controls the motors so that in each drive servo the product of the reel actual angular velocity, as indicated by said feedback signal, and the tape radius value, as indicated by said selected set of radius values, equals a preselected reference value of linear tape velocity.

5. The improvement of claim 1 further comprising:
   means for providing to each drive servo a tape tension force value, one of said drive servos increasing its motor drive control signal and the other drive servo decreasing its motor drive control signal in accordance with said force value, thereby to effectuate a desired tensioning of said tape.

6. In a magnetic tape drive assembly of the type in which separate motors are used to rotate a source reel and a take-up reel respectively, the improvement for achieving substantially constant linear velocity of the tape moving between said reels comprising:
   a separate fine tachometer encoder associated with each reel,
   a separate drive servo for each motor,
   a separate reel velocity measuring circuit associated with each reel for determining the actual angular velocity of the associated reel in accordance with the timing between consecutive pulses from the encoder associated with that reel, and
   two tape radius calculator means for ascertaining the current radius of tape on each reel by reference to the number of pulses produced from the fine encoder for one reel during a revolution of the other reel,
   wherein each drive servo includes means for controlling its respective reel motor so that the product of actual measured angular velocity for that reel times the ascertained tape radius of that reel equals a certain preselected value of linear tape velocity.

7. The improvement of claim 6 further comprising:
   means for providing to each drive servo an open-loop tape tension force value, one of said drive servos increasing its motor drive control signal and the other drive servo decreasing its motor drive control signal in accordance with said force value and said calculated radius of tape of each reel, thereby to effectuate a desired constant tensioning of said tape while maintaining constant tape velocity.

8. In a magnetic tape drive assembly of the type in which separate motors are used to rotate a source reel and a take-up reel respectively, the improvement for achieving substantially constant linear velocity of the tape moving between said reels comprising:
   a separate fine tachometer encoder associated with each reel, each encoder providing multiple pulses at a pulse rate dependent on reel rotation speed;
   a separate drive servo for each motor;
   a reel velocity measuring circuit for determining actual angular velocity of the reels in accordance with the timing between consecutive pulses from the encoder associated with the respective reels, wherein said reel velocity measuring circuit includes:

first and second tape radius calculation circuits, each receiving pulses from a respective one of said separate fine encoders and calculating therefrom the radius values of tape on both of said reels, and radius information selector means for selecting, for use by said drive servos, that set of radius values which is calculated by that calculation circuit which is receiving the greater number of pulses per revolution of the other reel;

wherein each drive servo includes means for controlling its respective reel motor so that the product of actual measured angular velocity for that reel times the ascertained tape radius of that reel equals a certain preselected value of linear tape velocity.

9. A tape radius calculator for a magnetic tape drive assembly having first and second reels between which tape is transported, comprising:

first and second fine encoders each associated with a respective reel, each encoder providing multiple pulses at a pulse rate dependent on reel rotation speed, first and second tape radius calculation circuits, each receiving pulses from a respective one of said encoders and each calculating therefrom the radius values of tape on both of said reels, and radius information selector means for selecting for output that set of radius values which is calculated by that calculation circuit which is receiving encoder pulses at the greater pulse rate.

10. The tape radius calculator of claim 9, wherein each of said encoders also includes means for providing at least one index signal, per single revolution of the associated reel, the number of index signals per single revolution being less than the number of pulses provided by the encoders per single revolution of the associated reel and wherein said selector means ascertains which encoder has the greater pulse rate by determining which encoder currently is producing the greater number of pulses between two consecutive index signals from the other encoder, and wherein each of said radius tape calculation circuits calculates the radius values by counting the number of pulses received from the respective one of said encoders between two consecutive occurrences of the index signal from the other encoder.

* * * * *